Oct. 16, 1923.

J. S. RONCATI 1,471,064

TROLLEY WHEEL

Filed April 8, 1922

INVENTOR.
Joseph Siro Roncati
BY Arthur P. Knight
ATTORNEY.

Patented Oct. 16, 1923.

1,471,064

UNITED STATES PATENT OFFICE.

JOSEPH SIRO RONCATI, OF LOS ANGELES, CALIFORNIA.

TROLLEY WHEEL.

Application filed April 8, 1922. Serial No. 550,713.

*To all whom it may concern:*

Be it known that I, JOSEPH SIRO RONCATI, a subject of the King of Italy, who has declared his intention of becoming a citizen of the United States, residing at Los Angeles, in the county of Los Angeles and State of California, have invented a new and useful Improvement in Trolley Wheels, of which the following is a specification.

The main object of this invention is to provide a trolley wheel which will fit or hug the trolley wire sufficiently close to minimize the tendency of the trolley wheel to leave the wire and at the same time permit the trolley wheel to pass freely over frogs, crossings, switches or curves.

Figure 1:
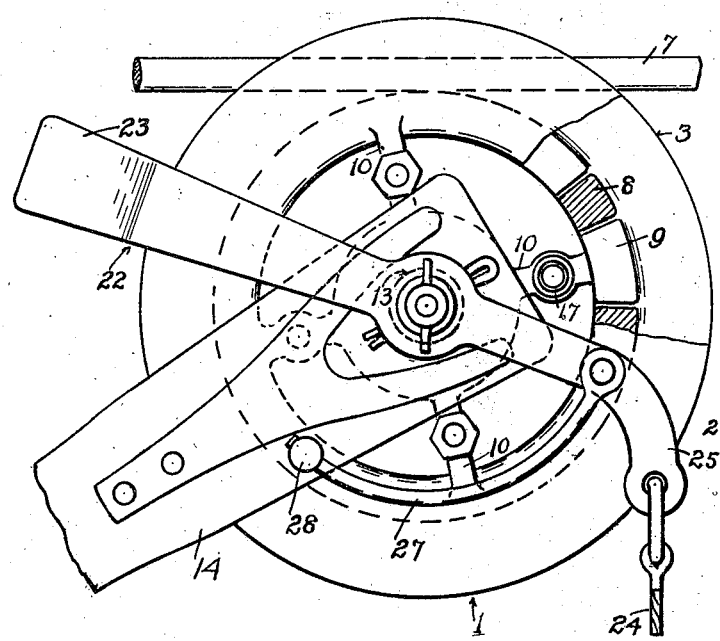
Figure 2:
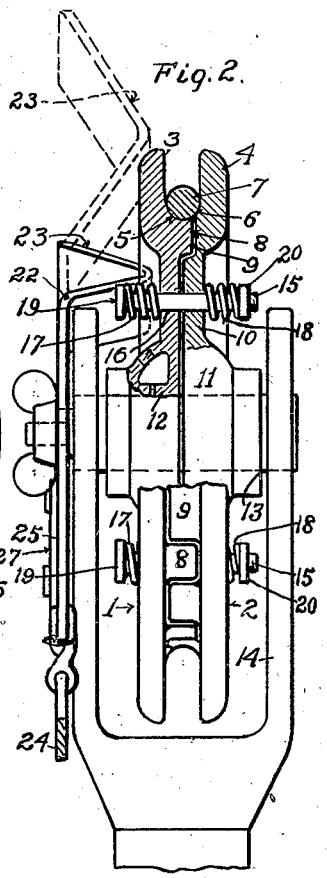
Figure 3:
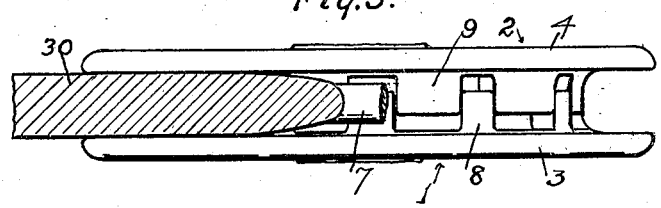

The accompanying drawings illustrate an embodiment of my invention and referring thereto: Fig. 1 is a partly broken side elevation of the trolley wheel; Fig. 2 is a partly broken rear elevation thereof; Fig. 3 is a plan of the trolley wheel in the position occupied when entering on a frog, a portion of the frog being shown in section.

The trolley wheel constructed according to my invention comprises two members, 1 and 2, formed respectively with side flanges 3 and 4, adapted to embrace the trolley wire and with concave projecting portions, 5 and 6 adapted to extend under the trolley wire, indicated at 7 and forming, in conjunction with the side flanges 3 and 4, an annular groove for receiving the trolley wire. The projecting portions 5 and 6 are preferably provided respectively with any desired number of teeth or projections 8 and 9 which interengage or mesh with one another so as to always present a substantially continuous groove surface and to hold the members 1 and 2 against relative circumferential movement, while permitting relative lateral movement thereof, that is to say, movement transverse to the plane of the trolley wheel or parallel to the axis thereof. Members 1 and 2 of the trolley wheel are shown as provided with radial arms or spokes 10 connecting the same rigidly with hub members 11, which are provided with the bearing 12 whereby they are journalled on the spindle or bearing pin 13 of the trolley wheel, which is mounted in the usual manner on the harp indicated at 14. The members 1 and 2 of the trolley wheel are yieldingly connected, for example, by means of bolts or pins 15, extending through openings 16 in the respective spokes 10, springs 17 and 18 being provided respectively between the heads 19 of said bolts and the spokes 10 and between the nuts 20 of said bolts and spokes 10 so as to tend to yieldingly hold the members 1 and 2 toward one another. By adjusting the nuts 20, the pressure of springs 17 and 18 may be varied to give any desired pressure on the members 1 and 2 so as to hold them close to the trolley wire or to cause them to press on the trolley wire.

A guide 22 pivotally mounted on the trolley pin 13 is formed with an inclined face 23 adapted to guide the trolley wheel on to the trolley wire, when the guide is raised to position shown in dotted lines in Fig. 2. Said guide is normally in lowered position, under the action of gravity, as shown in full lines, so as to be clear of the wire and is raised by pulling a cord 24 which is connected to an arm 25 of said guide. A segment bar 27 connected to arm 25 runs in a guide 28 on harp 13 and serves to support the guide 22.

In normal operation the trolley wheel runs on the trolley wire in such manner as to fit the same closely thereby preventing or restraining the trolley wheel from leaving the wire, and also providing effective contact of the wheel with the wire. In passing over enlargements on the wire, such as those presented at frogs (as indicated at 30 in Fig. 3), switches, crossings or hangers, or in passing around curves, the trolley wheel expands or spreads laterally, the two members 1 and 2 of the wheel spreading apart against the yielding pressure of the springs 17 and 18, so as to permit the wheel to pass such enlargement or to round the curve, without undue obstruction; the parts of the wheel closing together again when the enlargement or curve is passed. The tension of the springs 17 and 18 is adjusted to provide the desired amount of yielding pressure.

What I claim is:

1. A trolley wheel comprising a bearing pin, two trolley wheel members mounted on said bearing pin in such a manner as to turn thereon and to permit of a relatively sliding movement of said trolley wheel members toward and from one another, and spring means for yieldingly holding the two trolley wheel members toward one another so as to allow said members to slide apart in passing an enlargement on the wire, said trolley wheel members being provided with flanges forming a groove adapted to fit the trolley wire and with interengaging projections in the grooved portion thereof adapted to form a bearing surface for the trolley wire in the relatively sliding movement of the trolley wheel members.

2. A construction as set forth in claim 1 and comprising a plurality of bolts extending through the trolley wheel members and on which the trolley members are relatively slidable, the aforesaid spring means being mounted on said bolts.

3. A construction as set forth in claim 1 wherein said interengaging projections on the trolley wheel members form a substantially continuous surface circumferentially of the trolley wheel groove.

In testimony whereof I have hereunto subscribed my name this 31st day of March 1922.

JOSEPH SIRO RONCATI.